(12) United States Patent
Oetiker et al.

(10) Patent No.: US 7,421,930 B2
(45) Date of Patent: Sep. 9, 2008

(54) HOSE CLAMP AND CLOSING TOOL

(75) Inventors: Hans Oetiker, deceased, late of Horgen (CH); by Marco Lorez, legal representative, Meilen (CH); by Paul Nef, legal representative, Herrliberg (CH); Ulrich Meier, Wadenswil (CH)

(73) Assignee: Hans Oetiker AG Maschinen- und Apparatefabrik, Horgen (CH)

( * ) Notice: Subject to any disclaimer, the term of this patent is extended or adjusted under 35 U.S.C. 154(b) by 0 days.

(21) Appl. No.: 11/676,779

(22) Filed: Feb. 20, 2007

(65) Prior Publication Data
US 2007/0137439 A1 Jun. 21, 2007

Related U.S. Application Data

(62) Division of application No. 10/471,945, filed on Mar. 30, 2004, now abandoned.

(51) Int. Cl.
B25B 27/10 (2006.01)
B25B 7/02 (2006.01)

(52) U.S. Cl. .......................... 81/9.3; 81/426.5

(58) Field of Classification Search ............... 81/9.3, 81/418, 416, 419, 421–423, 426.5
See application file for complete search history.

(56) References Cited

U.S. PATENT DOCUMENTS

| 191,039 | A | * | 5/1877 | Ellis | 81/9.3 |
|---|---|---|---|---|---|
| 319,775 | A | * | 6/1885 | Barney | 81/426.5 |
| 1,064,404 | A | * | 6/1913 | Walker | 81/419 |
| 1,119,437 | A | * | 12/1914 | Lautz et al. | 81/9.3 |
| 1,141,916 | A | * | 6/1915 | Aderer | 81/419 |
| 1,405,587 | A | * | 2/1922 | Hopkins | 81/9.3 |
| 1,490,847 | A | * | 4/1924 | Petersen | 81/9.3 |

FOREIGN PATENT DOCUMENTS

DE 718 973 * 3/1943

* cited by examiner

*Primary Examiner*—Hadi Shakeri
(74) *Attorney, Agent, or Firm*—Barnes & Thornburg LLP

(57) ABSTRACT

A hose clamp for limited diameters, in the form of an open band ring having overlapping band ends, is manufactured from the band material of an insert as is used in conventional hose clamps for bridging an ear gap, such insert being typically made of steel according to DIN 1.4310 having a thickness of 0.3 mm. An opening is provided near one band end and a hook for engaging the opening is provided near the other band end. For closing this hose clamp, a gripper-type tool is used, the two jaws of which, in the closed condition, constitute an essentially uninterrupted inner surface having a diameter corresponding to the outer diameter of the closed hose clamp.

6 Claims, 2 Drawing Sheets

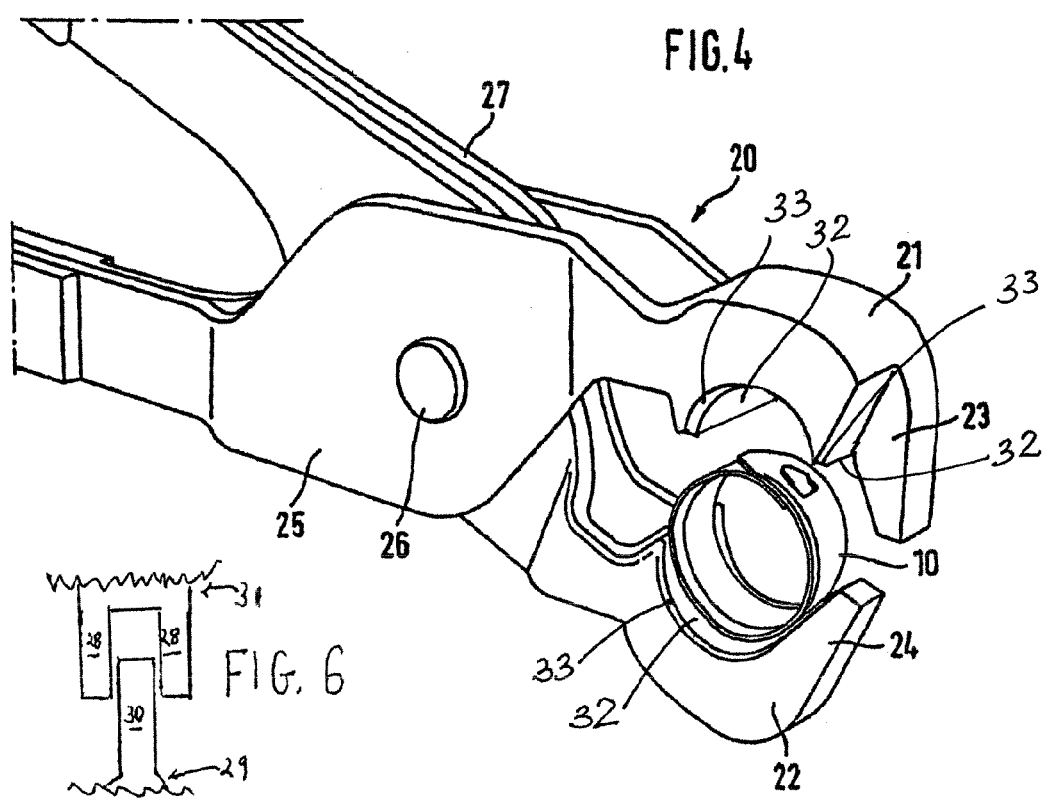
FIG.4
FIG.6
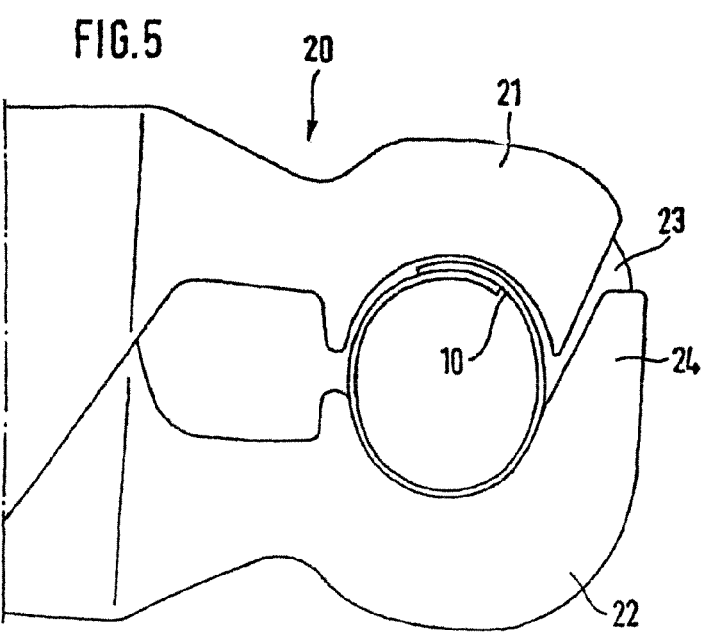
FIG.5

HOSE CLAMP AND CLOSING TOOL

CROSS REFERENCE

This application is a divisional of U.S. patent application Ser. No. 10/471,945 filed Mar. 30, 2004, which claims priority to the national stage of PCT Application PCT/EP02/02655 filed Mar. 11, 2002, which claims benefit of EP Patent Application 01106955.6 filed Mar. 20, 2001.

BACKGROUND OF THE INVENTION

U.S. Pat. No. 4,312,101 discloses a hose clamp which, after having been applied to the hose/nipple connection to be sealed, is tightened by deforming an ear provided in the clamp. To prevent the hose from entering the ear during tightening and thereby being lifted off the nipple, the known hose clamp is provided with an insert made of band material which is inserted into the clamp so as to bridge the gap of the ear.

While an easily deformable steel according to DIN 1.4301 having a typical thickness of 0.6 mm is used for normal hose clamps, specifically clamps of the above-described type with an ear that is to be tightened, inserts are made of an essentially thinner material, typically steel according to DIN 1.4310 with a thickness of 0.2 to 0.4 mm which has high resiliency and high stiffness, is correspondingly difficult to deform and is therefore unsuited for ear clamps. The steels DIN 1.4301 and 1.4310 are defined in European standard DIN EN 10088-2 dated Aug. 1995.

The present invention is based on the idea that a band material, which is typical with such inserts for known hose clamps, is used for manufacturing the hose clamps themselves. In this way, the same starting material is used for an additional purpose, resulting in a saving of cost. In doing so, it is principally possible that finished inserts, which are intended for use with known hose clamps and are cut and formed to the shape provided therefore, are employed for making hose clamps according to the invention.

The embodiment wherein the material of the band ring is steel according to DIN 1.4310 having a thickness of 0.2 to 0.3 mm and wherein the band ring has border regions raised outwardly from a center portion that takes a substantial part of the band width is advantageous for the stiffness of the hose clamp. Having the center portion of the band ring provided with a curved cross-section or having the center portion of the band ring provided with an outwardly convexly curved cross-section provides a hose clamp with an intrinsic prestress which is not only advantageous for compensating tolerances but also ensures the hose clamp to resiliently engage the hose when the hook in inserted in the opening.

Having the outer overlapping band end of the open band ring have its terminal edge chamfered in the areas of raised border regions results in the hose clamp being easy to close.

Having the hook partially punched and pressed out of the band material wherein the hook in the closed condition projects beyond the plane portion of the band ring no further than the outwardly raised border regions results in a hose clamp of low profile without any parts projecting far radially outwardly.

A typical field of application of the hose clamp according to the invention is where the hose clamps have a diameter of up to 20 mm, preferably 3 to 13 mm, wherein the band material has a width of 5 to 12 mm, preferably 8 mm, and a thickness of at most 0.4 mm, preferably 0.3 mm.

A tool for closing a hose clamp which consists of an open band ring having overlapping ends, an opening located in one band end and a hook located in the other band end for engaging the opening, specifically for closing the hose clamp wherein the tool is formed as a pair grippers with two jaws which in the closed condition form an inner surface having a diameter corresponding to the outer diameter of the closed hose clamp and wherein the inner surfaces of the jaws form a smooth cylindrical surface over their substantial width with enlarged border regions is particularly suited for closing the hose clamp according to the invention. This tool permits performing the closure by means of a simple gripper movement with the hook engaging the opening.

Having the jaws of the tool form a substantially uninterrupted inner surface in the closed condition and having the jaws be exchangeable in accordance with the diameter of the respective hose clamp are suitable measures to ensure a uniform closure of the hose clamp to a cylindrical ring.

Having the tips of the jaws overlap each other in the closed condition and having the tips of the jaws have their widths reduced to substantially one-half, ensures that the hose clamp is engaged by the tool over its entire circumference.

Wherein, in the hinge region, one gripper arm is formed by two legs, with the other gripper arm crossing between the two legs or wherein the tip of one jaw has two outer tines between which a central tine formed at the tip of the other jaw engages in the closed condition of the grippers, are of advantage in that they safely prevent canting during closure, which could result in deviations of the finished, closed hose clamp from the cylindrical shape.

A preferred embodiment of the invention will now be explained in more detail with reference to the drawings.

BRIEF DESCRIPTION OF THE DRAWINGS

FIG. 4 illustrates an open tool with an open hose clamp inserted,

FIG. 5 shows the same tool in the closed condition, and

FIG. 6 shows a modified jaw structure for the tool.

DETAILED DESCRIPTION OF THE DRAWINGS

Figure 1:
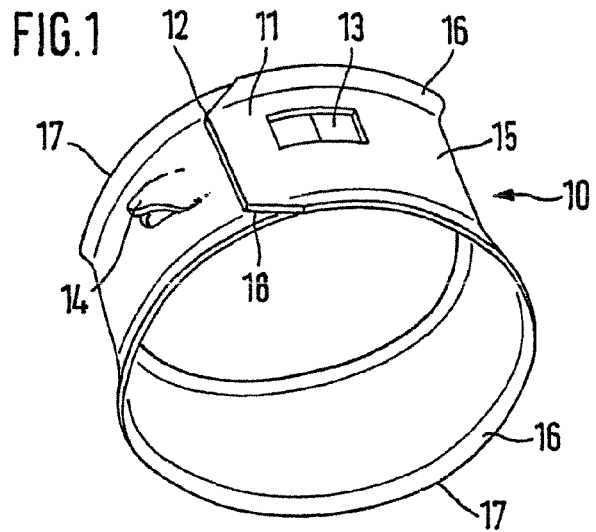
FIG. 1 shows a hose clamp in the open condition.

According to FIG. 1, the hose clamp consists of an open band ring 10 of steel according to DIN 1.4310, which is pre-bent such that the band ends 11, 12 overlap each other. A rectangular opening 13 is punched from the outer overlapping band end 11 while a hook 14 is formed in the inner band end 12 by partial punching and pressing out of the band material. The closed condition of the hose clamp represented in FIG. 2 is ensured by the hook 14 engaging the opening 13.

The thickness of the band material is at most 0.4 mm, preferably 0.3 mm; its width is typically between 5 and 12 mm, and is preferably 8 mm. Such a band material is suitable specifically for hose clamps which, in the closed condition shown in FIG. 2, have an inner diameter of up to 20 mm, preferably between 3 and 13 mm. The maximum diameter may be over 20 mm if suitable closing means (grippers) are available.

Figure 2:
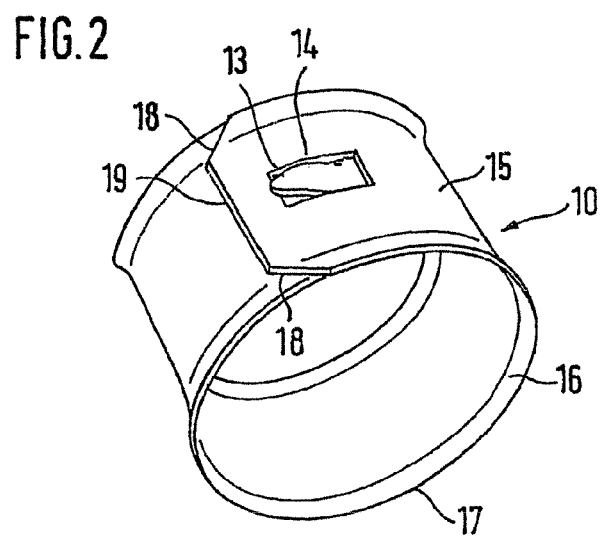
FIG. 2 shows the same hose clamp in the closed condition.

As shown in FIGS. 1 and 2, the band ring 10 has a center portion 15 which takes the substantial width of the ring, and outwardly raised border regions 16. With a total width of the band ring 10 of 8 mm, the width of each raised border region 16 is approximately 1 mm.

The amount by which the outer edges 17 of the band ring 10 project beyond its centre portion 15 corresponds at least to the thickness of the band material.

The hook 14 has its open end bent out of the band ring 10 by an amount which is somewhat larger than the thickness of the band material. This ensures a safe anchoring of the hook 14 at the corresponding edge of the opening 13 in the closed condition of the hose clamp.

The outwardly raised border regions 16 serve not only to increase the stiffness of the band ring 10; their effect is also that the hook 14 in the engaged condition does not project beyond the outer profile of the band ring 10, thereby reducing the chance of the hook 14 to become inadvertently disengaged from the opening 13, resulting in the hose clamp to open. Further, the outwardly raised border regions 16 serve for the mutual guidance of the two and ends until the hook 14 snaps into the opening 13. Finally, the raised border regions 16 are also of advantage in that sharp edges are avoided which could cut into the hose to be sealed.

The outer overlapping band end 11 is chamfered at both sides, as shown at 18 in FIGS. 1 and 2, in such a way that the terminal edge 19 has a length which substantially corresponds to the width of the centre portion 15 of the band ring 10. The chamfers 18 serve for better guidance and centring during bending and closing of the hose clamp.

Figure 3A:
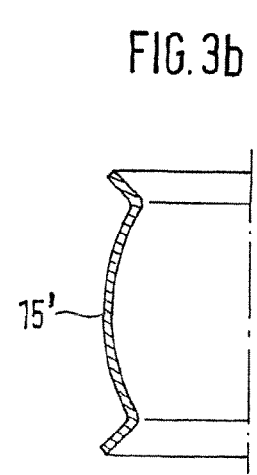
FIGS. 3a to 3c represent cross-sections through the hose clamp.
Figure 3B:
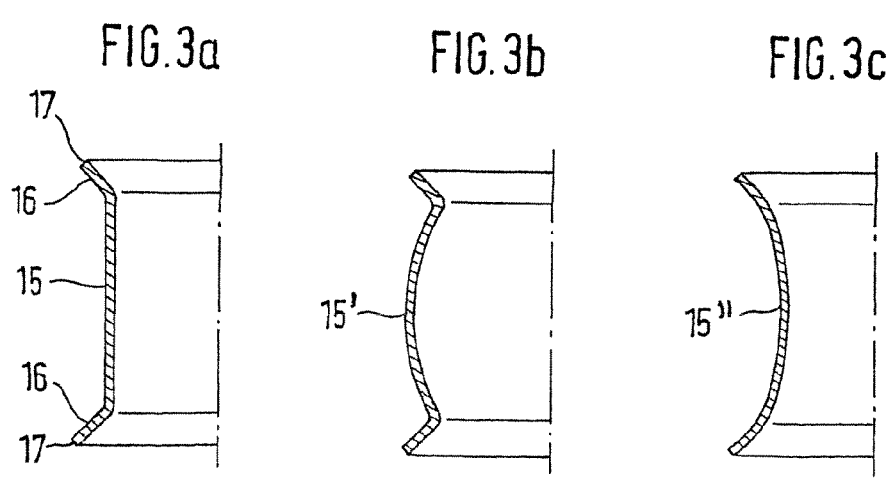
Figure 3C:
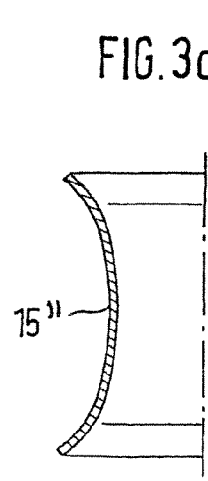

The band ring 10 shown in FIGS. 1 and 2 has the cross-section represented in FIG. 3a in which the centre portion 15 is cylindrical. Alternatively, as shown in FIGS. 3b and 3c, the region 15', 15" may be provided with an outwardly convex or concave curvature to give the band ring 10 an elasticity reserve. As a result of this, the hose clamp is easier to close and, after hooking, resiliently engages the hose to be sealed. At the same time, the clamp is less critical to tolerances.

The tool 20 represented in FIGS. 4 and 5 for closing the hose clamp shown in FIGS. 1 and 2 is in the form of grippers, the jaws 21, 22 of which, in the closed condition represented in FIG. 5, constitute a practically uninterrupted cylindrical inner surface with a diameter corresponding to the outer diameter of the closed clamp 10.

In cross-section, this inner surface is shaped complementarily to the outer surface of the clamp 10; in other words, the inner surfaces of the jaws 21, 22 have a cylindrical central portion 32 with enlarged border regions 33. This complementary shape not only ensures that the hose clamp 10 is completely closed; it also causes the hose clamp 10 to be centred and aligned during closing.

The tips 23, 24 of the jaws 21, 22 are reduced to half the width of their main portions so that they overlap each other in their closed condition. This avoids an interruption of the cylindrical surface of the jaws 21, 22 surrounding the hose clamp in the closed condition of the tool 20.

The gripper arm 25 carrying the jaw 21 is formed with two legs in the region of the pivot pin 26, and the gripper arm 27 carrying the jaw 22 crosses the arm 25 between the two legs thereof. This avoids canting with the result that the jaws 21, 22 close precisely to the said cylindrical shape.

In a modification shown in FIG. 6 of the drawings, the tips of the jaws may be shaped such that one 29 of them has a central tine 30 which in the closed condition engages between two outer tines 28 provided on the other jaw 31. This structure also avoids canting.

In order to close hose clamps of different diameters using the same grippers, the jaws may be exchangeable, with a corresponding pair of jaws being used for each hose clamp. As an alternative, the jaws may be provided with prismatic inner surfaces.

The embodiment described above with reference to FIGS. 4 and 5 relates to a special tool designed specifically for closing the hose clamp of FIGS. 1 to 3.

The invention claimed is:

1. A tool for closing a hose clamp which consists of an open band ring having a central portion which constitutes a substantial portion of the width of the band ring, border regions raised outwardly from the central portion, mutually overlapping ends, an opening located in one end of said band ring and a hook located in the other end of said band ring for engaging said opening, wherein the tool is formed as a pair grippers having two jaws which, in the closed condition of the tool, form an inner surface having a diameter corresponding to the outer diameter of the closed hose clamp, the inner surfaces forming a substantially smooth cylindrical surface with enlarged border regions corresponding to the outward raised border portions of the band ring, wherein the pair of grippers have a first arm formed by a pair of legs and a second arm crossing between the pair of legs of said first arm within a hinged region of the tool, wherein the jaws have tip portions which overlap each other in the closed condition of the tool, and wherein said tip portions have a width substantially one-half the width of the remaining parts of said jaws.

2. The tool of claim 1, wherein said jaws, in the closed position of the tool, form a substantially uninterrupted inner surface.

3. The tool of claim 1, wherein said jaws are exchangeable in accordance with the diameter of the respective hose clamp to be closed.

4. A tool for closing a hose clamp which consists of an open band ring having a central portion which constitutes a substantial portion of the width of the band ring, border regions raised outwardly from the central portion, mutually overlapping ends, an opening located in one end of said band ring and a hook located in the other end of said band ring for engaging said opening, wherein the tool is formed as a pair grippers having two jaws which, in the closed condition of the tool, form an inner surface having a diameter corresponding to the outer diameter of the closed hose clamp, the inner surfaces forming a substantially smooth cylindrical surface with enlarged border regions corresponding to the outward raised border portions of the band ring, wherein the pair of grippers have a first arm formed by a pair of legs and a second arm crossing between the pair of legs of said first arm within a hinged region of the tool, wherein the jaws have tip portions which overlap each other in the closed condition of the tool, and wherein one of said jaws has a first tip portion formed by a pair of tines, and the other jaw has a second tip portion formed with a central tine, the central tine engaging between the pair of tines of said first tip portion in the closed condition of said tool.

5. The tool of claim 4, wherein said jaws, in the closed position of the tool, form a substantially uninterrupted inner surface.

6. The tool of claim 4, wherein said jaws are exchangeable in accordance with the diameter of the respective hose clamp to be closed.

* * * * *